A. PEIRCE.
Wagon Brake.
No. 90,186.
Patented May 18, 1869.
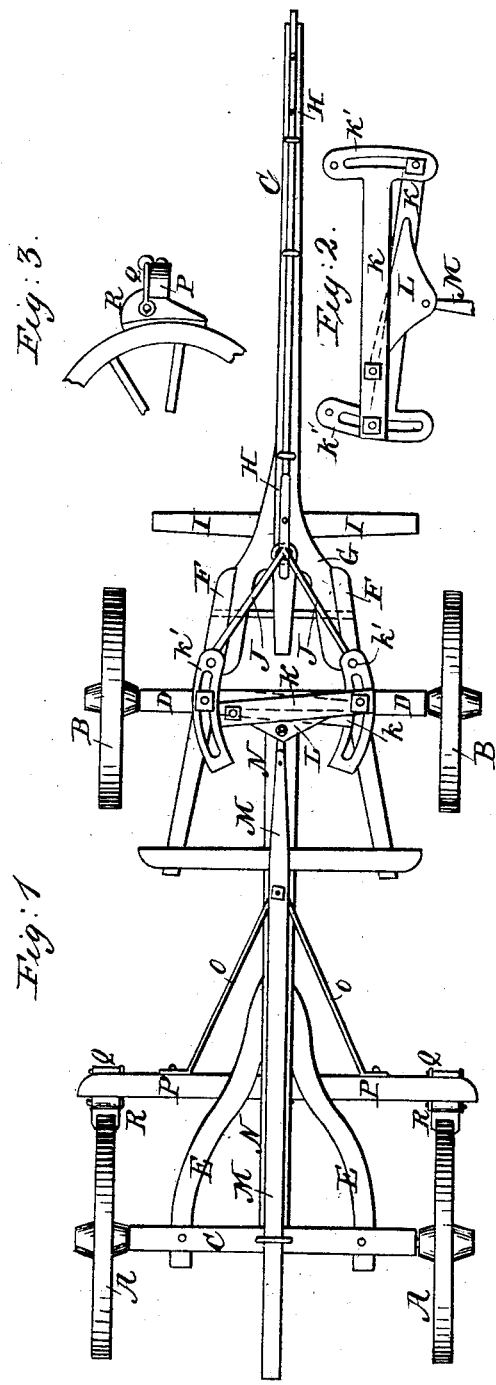

United States Patent Office.

ANSON PEIRCE, OF LAKE CITY, MINNESOTA.

Letters Patent No. 90,186, dated May 18, 1869.

IMPROVED WAGON-BRAKE.

The Schedule referred to in these Letters Patent and making part of the same.

*To all whom it may concern:*

Be it known that I, ANSON PEIRCE, of Lake City, in the county of Wabasha, and State of Minnesota, have invented a new and useful Improvement in Wagon-Brakes; and I do hereby declare that the following is a full, clear, and exact description thereof, which will enable others skilled in the art to make and use the same, reference being had to the accompanying drawings, forming part of this specification, in which—

Figure 1 is an under-side view of the running part of a wagon, to which my improvement has been attached.

Figure 2 is a detail view of the pivoted and slotted levers.

Figure 3 is a detail view of the brake-shoe.

Similar letters of reference indicate corresponding parts.

My invention has for its object to improve the construction of that class of wagon-brakes that is operated by the forward pressure of the wagon in descending a hill, so as to make the brakes more satisfactory and reliable in operation; and It consists in the construction and combination of various parts of the brake, as hereinafter more fully described.

A are the rear wheels; B are the fore wheels; C is the rear axle; D is the fore axle; E are the rear hounds; F are the fore hounds; and G is the tongue; about the construction of which parts there is nothing new.

H is a rod running longitudinally along the under side of the tongue G, being kept in place by staples or keepers attached to said tongue, so that the said rod H may have a free longitudinal movement.

Upon the lower side of the forward end of the rod H is formed a downwardly-projecting shoulder, against which the neck-yoke ring rests when the horses are holding back.

I is the double-tree, which is connected with the rear part of the rod H by a bolt passing through a slot in the rear part of the tongue G, so that the said double-tree may move forward and back with the said rod, so as to keep the trace always of the same tautness, the draught being sustained by the said bolt resting against the tongue at the forward end of the said slot.

To the rear end of the rod H are pivoted the forward ends of the two short rods J, the rear ends of which are hooked into or otherwise pivoted to the forward ends of the cross-heads k' of the levers K. One end of each of the levers K is pivoted to the axle D by bolts, said bolts passing through curved slots in the cross-heads k', formed upon the other or free ends of said levers, as shown in figs. 1 and 2.

L is a plate or bar, which is placed between the two levers K, and which may be made triangular in form. The ends of the plate L are pivoted to the levers K, the one end to the one lever near its pivoted end, and the other end to the other lever near its pivoted end, as shown in figs. 1 and 2.

To the rear angle or edge of the plate, or bar L, is hooked or otherwise pivoted the forward end of the sliding bar, or rod M, which passes back beneath the reach N, and the rear end of which passes through, and slides back and forth in a socket or keeper formed in or attached to the rear axle C.

O are rods, the forward ends of which are secured to the sliding bar M, and the rear ends of which are secured to the brake-bar P, so that the said brake-bar may be moved back and forth by the movement of the said sliding bar M.

The two brace and connecting-rods O may be made in one piece, if desired.

The brake-bar P passes through and works in a long keeper attached to the upper side of the rear hounds E or of the reach N, and is kept in place by pins attached to said brake-bar, and projecting at each edge of said keeper.

To the forward side of the ends of the brake-bar P are pivoted the ends of the links Q, to the other ends of which are pivoted the brake-shoes R, so that when the wagon is backed, the friction of the wheels A may raise the said brake-shoes R to avoid checking the movement of said wheels.

The brake-shoes R are made somewhat wedge-shaped, and are provided with a shoulder upon the upper part of their forward sides, as shown in fig. 3, so as to relieve the links Q from the downward pressure when the brakes are applied with power.

Having thus described my invention,

I claim as new, and desire to secure by Letters Patent—

The pivoted levers K, having slotted cross-heads k' formed upon their free ends, the plate, or bar L, and connecting-rods J, in combination with each other and with the tongue-rod H, axle D, and sliding bar M, by which the brake-bar P is operated, substantially as herein shown and described, and for the purpose set forth.

ANSON PEIRCE.

Witnesses:
 GEO. P. SMITH,
 H. L. HALSEY.